US 7,890,768 B2

Feb. 15, 2011

(12) United States Patent
Singh et al.

(54) METHODS, SYSTEMS, AND COMPUTER PROGRAM PRODUCTS FOR ENTERING SENSITIVE AND PADDING DATA USING USER-DEFINED CRITERIA

(75) Inventors: Mona Singh, Cary, NC (US); Jeffrey Scott Bardsley, Durham, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1195 days.

(21) Appl. No.: 11/290,035

(22) Filed: Nov. 30, 2005

(65) Prior Publication Data

US 2007/0124601 A1   May 31, 2007

(51) Int. Cl.
*G06F 21/20* (2006.01)
*G06Q 20/00* (2006.01)

(52) U.S. Cl. .............................. 713/183; 705/72; 705/18

(58) Field of Classification Search ................. 713/183; 705/72, 18
See application file for complete search history.

(56) References Cited

U.S. PATENT DOCUMENTS

| | | | |
|---|---|---|---|
| 4,122,533 A | 10/1978 | Kubinak | |
| 4,185,282 A | 1/1980 | Pick | |
| 4,621,334 A | 11/1986 | Garcia | |
| 4,805,222 A | 2/1989 | Young et al. | |
| 5,097,506 A | 3/1992 | Kaiser, Jr. et al. | |
| 6,092,130 A | 7/2000 | Horiike | |
| 6,509,847 B1 | 1/2003 | Anderson | |
| 6,643,784 B1 | 11/2003 | McCulligh | |
| 6,715,086 B1 | 3/2004 | Himmel et al. | |
| 6,798,887 B1 | 9/2004 | Andre | |
| 6,904,526 B1 * | 6/2005 | Hongwei | 713/182 |
| 6,912,605 B1 | 6/2005 | Wright | |
| 6,954,862 B2 * | 10/2005 | Serpa | 726/5 |
| 6,990,586 B1 * | 1/2006 | Tresser et al. | 713/182 |
| 7,069,584 B1 * | 6/2006 | Davis | 726/5 |
| 2002/0157025 A1 | 10/2002 | Cragun et al. | |
| 2003/0037262 A1 * | 2/2003 | Hillhouse | 713/202 |
| 2003/0084301 A1 | 5/2003 | Krawetz | |
| 2003/0172281 A1 * | 9/2003 | Lee | 713/183 |
| 2004/0054929 A1 | 3/2004 | Serpa | |
| 2004/0250141 A1 | 12/2004 | Casco-Arias et al. | |
| 2005/0044425 A1 | 2/2005 | Hypponen | |
| 2005/0110611 A1 | 5/2005 | Ronkainen | |
| 2005/0262555 A1 * | 11/2005 | Waterland | 726/21 |

(Continued)

OTHER PUBLICATIONS

Ross, Blake et al. "Stronger password authentication using browser extensions", SSYM'05: Proceedings of the 14th conference on USENIX Security Symposium—vol. 14, Jul. 2005.*

(Continued)

*Primary Examiner*—Michael J Simitoski

(57) ABSTRACT

Disclosed are methods, systems, and computer program products for identifying sensitive data from a user-entered input sequence based on user-defined criteria. According to one method, user-defined criteria for identifying sensitive data within user-entered input sequences that include sensitive data and padding data are received. A request for sensitive data from a requesting agent is presented. A user-entered input sequence that includes sensitive data and padding data is received in response to the request for sensitive data. Sensitive data is identified within the user-entered input sequence using the user-defined criteria. The identified sensitive data is provided to the requesting agent in response to the request for sensitive data.

31 Claims, 5 Drawing Sheets

U.S. PATENT DOCUMENTS

2005/0273625 A1* 12/2005 Dayan et al. ............... 713/184
2006/0143450 A1* 6/2006 Airody et al. ............... 713/168

OTHER PUBLICATIONS

"Who Are You?," http://www.securityinfowatch.com/article/printer.jsp?id=6275, pp. 1-2 (Nov. 7, 2005).

"UberGeek Keyboard," http://www.dhigu.com/archive/2005/06/15/Das_Keyboard.aspx, pp. 1-4 (Jun. 15, 2005).

Woods et al., "Shoulder Surfing as Dangerous as Online Theft," SitNews, pp. 1-2 (Apr. 3, 2005).

"Walkthrough: Validating User Input in a Web Forms Page," http://msdn.microsoft.com/library/en-us/vbcon/html/vbw1kWalkthroughvalidatinguserinputinwebformspage.asp), pp. 1-6 (Copyright 2005).

Lowery, "Encrypting Fields in Domino and Notes," DominoPower Magazine, pp. 1-3 (Copyright 1998-2005).

"Reducing the Risk of Identity Theft," Privacy Rights Clearinghouse, pp. 1-7 (May 1995, Revised Feb. 2003).

Giblin, "Sacramento Valley Hi-Tech Crimes Task ,Force," http://www.sachitechcops.org/news012604.htm, pp. 1-5 (Publication Date Unknown).

* cited by examiner

METHODS, SYSTEMS, AND COMPUTER PROGRAM PRODUCTS FOR ENTERING SENSITIVE AND PADDING DATA USING USER-DEFINED CRITERIA

TECHNICAL FIELD

The subject matter described herein relates to providing protection for sensitive data entry. More particularly, the subject matter described herein relates to methods, systems, and computer program products for entering sensitive and padding data using user-defined criteria.

BACKGROUND

Identity theft has recently become an increasing concern. Identity thieves attempt to acquire sensitive private information about individuals in order to impersonate them and steal their identities. With sensitive information in hand, identity thieves may, among many other activities, sign up for credit lines, get credit cards issued, take out loans, get cash advances—all in the name of a victim. Sensitive information may come in many forms. For example, sensitive information may include a social security number, an address, a birthday, a place of birth, a mother's maiden name, an account number, a password, and a personal identification number (PINs).

Identity thieves practice their trade in a variety of ways, including everything from hacking into private and corporate computers, sniffing the Internet for sensitive information, and shoulder surfing. Shoulder surfing is accomplished by standing behind a victim and watching the victim enter sensitive information. Victims may attempt to shield their keystrokes when they see someone standing behind them, but this often gives limited protection.

With the advent of new portable technologies, identity thieves are finding it easier to steal identities. Cellular phone cameras and portable information devices are being employed by identity thieves to capture transactions at communication terminals in public locations. Where shoulder surfing used to require a person to stand directly behind or very close to a person at a terminal in order to visually see the transaction, these new devices allow shoulder surfers to be more remotely located and still gain access to sensitive information. A victim of identity theft may not even realize that a thief is stealing his or her identity because of remote and seemingly random nature of movement by the thief.

When a user at a public terminal attempts to access or enter sensitive information by way of a bank machine or public internet terminal, it may be very difficult to detect a lurking thief. Further, identity thieves may learn the user interfaces for these terminals, thereby knowing exactly what keystrokes are required in order to complete a transaction. In this way, an identity thief may know exactly when sensitive information is being entered into the terminal. By knowing exactly when to capture sensitive information on a portable device, an identity thief may move about a public place without drawing attention to its plan. The thief may temporarily take a position of easy information access precisely when necessary and where necessary to capture sensitive information.

Accordingly, in light of difficulties associated with protection of sensitive information in public locations, there exists a need to be able to protect sensitive information entry through improved methods, systems, and computer program products for providing a user with a more secure sensitive data entry environment.

SUMMARY

According to one aspect, the subject matter described herein comprises methods, systems, and computer program products for identifying sensitive data from a user-entered input sequence based on user-defined criteria. One method includes receiving user-defined criteria for identifying sensitive data within user-entered input sequences that include sensitive data and padding data, presenting a request for sensitive data from a requesting agent, receiving a user-entered input sequence that includes sensitive data and padding data in response to the request for sensitive data, identifying the sensitive data within the user-entered input sequence using the user-defined criteria, and providing the identified sensitive data to the requesting agent in response to the request for sensitive data.

The subject matter described herein providing sensitive data identification from a user-entered input sequence based on user-defined criteria may be implemented using a computer program product comprising computer executable instructions embodied in a computer readable medium. Exemplary computer readable media suitable for implementing the subject matter described herein include disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Due to the concerns discussed above, there exists a need to improve data security at data entry terminals. Individuals also need to be able to have more control over their sensitive data entry to allow them to feel more secure with the use of data entry terminals. In response to these needs, methods, systems, and computer program products described herein allow a user to interactively define and use sensitive data entry criteria (rules). As used herein, the term "sensitive data" is data requested by a requesting agent, such as an application or browser, to be input by a user. It is not required that all data requested to be entered by a user be considered sensitive data. Techniques may be used, as described herein, to determine whether all or only some of data requested is sensitive data. As used herein, the term "padding data" is data entered by a user that is not requested by the requesting agent. Both sensitive data and padding data may be entered by a user in the same user input sequence. User-defined sensitive data entry criteria may allow for user-selected placement of padding data within user input sequences. By allowing a user to obscure sensitive data with user-defined placement of padding data, a user may disguise sensitive data within user input sequences. The placement of this padding data may be changed by the user regularly to thwart would-be identity thieves. These changes may be made using a terminal interface to allow user-interface data entry to be different each time a terminal is used by the same user, and potentially different for each user that uses a terminal. Thereby, identity theft may be made more difficult for an identity thief.

Figure 1:
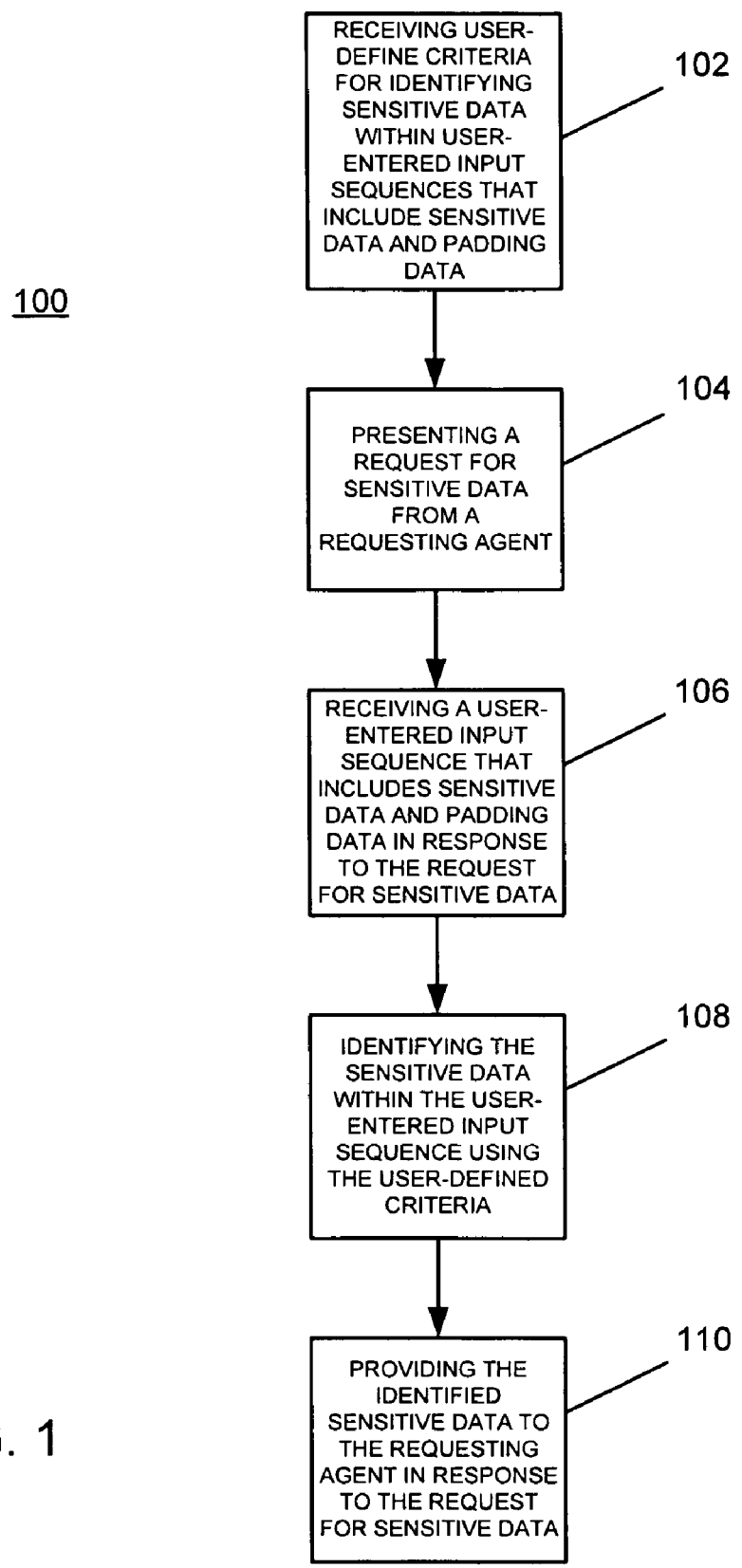
FIG. 1 is a flow chart illustrating exemplary steps by which a sensitive data process may identify sensitive data from a user-entered input sequence that contains sensitive data and padding data based on user-defined criteria according to an embodiment of the subject matter described herein.

FIG. 1 illustrates an exemplary sensitive data process 100 for identifying sensitive data from a user-entered input sequence that contains sensitive data and padding data based on user-defined criteria. At block 102, sensitive data process 100 may receive user-defined criteria for identifying sensitive data within a user-entered input sequences that includes sensitive data and padding data. Sensitive data process 100 may present a request for sensitive data from a requesting agent at block 104. At block 106, sensitive data process 100 may receive a user-entered input sequence that includes sensitive data and padding data in response to the request for sensitive data. At block 108, sensitive data process 100 may identify the sensitive data within the user-entered input sequence using the user-defined criteria. At block 110, sensitive data process 100 may provide the identified sensitive data to the requesting agent in response to the request for sensitive data.

Presentation of the request may be, for example, to a user of a terminal at a public location, such as a web-based bank account interface, an email account login screen, or any other sensitive data entry portal. A requesting agent may include, for example, a local application activated on a user interface device, or a remote application communicating through a network-based interface, such as a web-based application or browser interface. A requesting agent may also include, for example, a single sensitive data entry prompt within a local application or a local interface to a remote application. A sensitive data process, such as exemplary sensitive data process 100, may monitor application entry prompts and fields and activate whenever a sensitive data entry prompt or field is to be presented to a user for sensitive data entry. A user may also enable and disable a sensitive data process, such as exemplary sensitive data process 100, to allow more flexibility over time.

Many types of user-defined criteria may be used with a process such as sensitive data process 100. For example, a user may define a significant sequence rule, a pre-sensitive-data padding rule, a post-sensitive-data padding rule, an interval padding rule, a formulaic interval padding rule, a feedback rule, a combination rule, a sequence rule, and a default override rule. Other types of criteria are possible and all are considered within the scope of this disclosure.

An exemplary significant sequence rule may, for example, provide a user with the ability to define padding data which may include a sequence of one or more characters in length including at least one specific character. This exemplary significant sequence may appear before sensitive data within user-entered input sequences. By allowing a user to define a significant sequence rule in this way, a user may be allowed to disguise the entry of sensitive information by entering random strings of characters until the significant sequence is entered. The user may follow the significant sequence with the requested sensitive data thereby creating a user-entered input sequence that includes sensitive data and padding data in response to the request for sensitive data. An exemplary significant sequence rule may also be used without entry of random characters prior to the significant sequence. In either situation, a sensitive data process, such as exemplary sensitive data process 100, may identify the sensitive data within the user-entered input sequence using the user-defined criteria.

An exemplary pre-sensitive-data padding rule may allow a user to define the number of padded characters to appear before sensitive data within user-entered input sequences. Using a pre-sensitive-data rule, a user may disguise sensitive data by entering a character string of a specified length before the sensitive data that has been requested. In this way, the user need only remember a certain number of characters to pad input sequences with rather than a significant sequence of characters.

An exemplary post-sensitive-data padding rule may allow a user to choose a number of padding characters to appear after sensitive data within user-entered input sequences. As with the pre-sensitive-data padding rule, the post-sensitive data padding rule may allow a user to disguise sensitive data within an input sequence by entering a user-defined number of characters after the sensitive data. The user may do so by only remembering a number of padding characters to enter after the sensitive data. A post-sensitive-data padding rule may also be used without remembering the number of padding characters to appear after the sensitive data. In this way, the user may disguise sensitive data by entering random characters until the defined number of padding characters to appear after sensitive data within the user-entered input sequence have been entered.

An exemplary interval padding rule may allow a user to define a number of padding characters to appear between sensitive data characters within user-entered input sequences at user-defined intervals. An interval may be defined to be one or more characters in length. For example, an interval may be defined between each character of sensitive data within a user-entered input sequence, or may be any other interval of characters up to one character less than a sensitive data length. A user may also define a number of one or more padding characters to appear at each padding interval, as the user desires. In this way, a user may define interval padding to disguise sensitive data spacing padding data within user-entered input sequences.

An exemplary formulaic interval padding rule may allow user-defined padding locations within user-entered input sequences by use of a formula. A user may define or select a formula to apply both when the user is entering user-entered input sequences, and when a process such as exemplary sensitive data process 100 identifies the sensitive data within user-entered input sequences. Exemplary formulas may include, for example, addition, subtraction, multiplication, and division. These formulas may operate upon interval spacing and padding length/width. By defining a formulaic interval padding rule such as addition, for example, a user may define that one padding character be placed within a user-entered input sequence at increasing intervals. For example, by defining an addition-based formulaic interval padding rule where an addition factor of one (1) is used, a user may define that one padding character may be placed at a first location between a first and second sensitive data character (a sensitive data character interval of one), at a second location between a third and forth sensitive data character (a sensitive data character interval of two from the first interval padding location), and at a third location between a sixth and seventh sensitive data character (a sensitive data character interval of three from the second interval padding location). In this way, a user may define an increasing interval for padding character placement. With an addition-based formulaic interval padding rule, a user also may define that an increasing number of the padding characters be placed at each padding interval location. The padding interval may remain constant, or may be combined with the additive interval as discussed above. For an example of a combined additive number of padding characters and an additive interval with both additive factors a one (1), a user may define that one padding character may be placed at a first location between the first and second sensitive data character (a sensitive data character interval of one and one padding character), that two padding characters may be placed at a second location between a third and fourth sensitive data character (a sensitive data character interval of two from the first interval padding location with two characters of padding), and that three padding characters may be placed at a third location between a sixth and seventh sensitive data characters in a user-entered input sequence (a sensitive data character interval of three from the second interval padding location with three characters of padding). In this way, a user may define a formulaic interval-padding rule to allow for both varied padding interval placement and padding character width/length.

Any other additive method for identifying interval locations and padding character length may also be used. Accordingly, all additive formulas are considered within the scope of the present disclosure.

As with an addition-based formulaic interval padding rule, subtraction, multiplication, and division may also be applied in a variety of ways to create formulas for padding data character length and intervals within sensitive data for user-entered input sequences. Accordingly, any formula that may be used to identify a padding interval location and a padding character length is considered within the scope of this disclosure.

An exemplary feedback rule may allow a user to define a feedback type to present to the user as a prompt to enter either or both of a sensitive data portion or a padding data portion of a user-entered input sequence. This feedback may include any sensory feedback, such as, audible feedback, visual feedback, olfactory feedback, and tactile feedback. Taste-based feedback may also be used, though this may have health-related concerns for use with public terminals.

Exemplary audible feedback may include a tone generated at one frequency to prompt the user for sensitive data, and a tone generated at a different frequency to prompt the user for padding data. Another example of audible feedback may include playing a portion of a song during either sensitive data entry or padding data entry.

Exemplary visual feedback may include displaying a user-defined or user-selected icon to prompt the user for sensitive data and displaying a different icon to prompt the user for padding data. A single icon may be used to prompt the user for a sensitive data portion of a user-entered input sequence without prompting for padding data, or an icon may be used for padding data and removed from display for sensitive data portions.

Exemplary olfactory feedback may include prompting a user for sensitive data and padding data portions with one or more different scents, such as different perfumes or fragrances.

Exemplary tactile feedback may include changing the weight required to engage a keypad button associated with a user interface. By increasing or decreasing the weight required to engage a key and register a key press action, sensitive data and padding data prompting may be sensed only by the user. As another example, a mobile phone or other terminal could be set to vibrate during either sensitive data prompting or padding data prompting.

By using feedback indications, such as those discussed above, a user may be prompted with an indication for entry of both sensitive data and padding data portions of a user-entered input sequence. There are many other possible feedback indications that may be used. Accordingly, all are considered within the scope of this disclosure.

An exemplary combination rule may allow a user to combine any two or more of the previously describer user-defined criteria to allow for variations in user entry sequences over time. By defining combination rules, a user may easily change user-entered input sequences using other user-defined criteria.

An exemplary criteria sequence rule may allow a user to sequence through user-defined criteria at successive terminal interactions without changing criteria definitions at each terminal interaction. By sequencing through different user-defined criteria each time a terminal is used, an onlooker that may recognize a potential victim from previous terminal interactions may be thwarted by the change in input data padding. Further, by sequencing through previously defined criteria rather than interacting with setup procedures to change the padding procedure for the next terminal interaction, an onlooker may also be prevented from learning which rule will be used by the potential victim during the next terminal interaction. Sequencing through combination rules may also further enhance sensitive data protection.

An exemplary default override rule may allow a user to define a default sequence of one character or more to be used when any other user-defined criteria have been forgotten or when a user desires to bypass a difference user-defined criteria. A user-defined default override rule may also provide for an indication to prompt the user to enter sensitive data and padding data portions of a user-entered input sequence. An indication used with a default override rule may be defined by a user to include any feedback indication discussed above in relation to the feedback rule.

Figure 2:
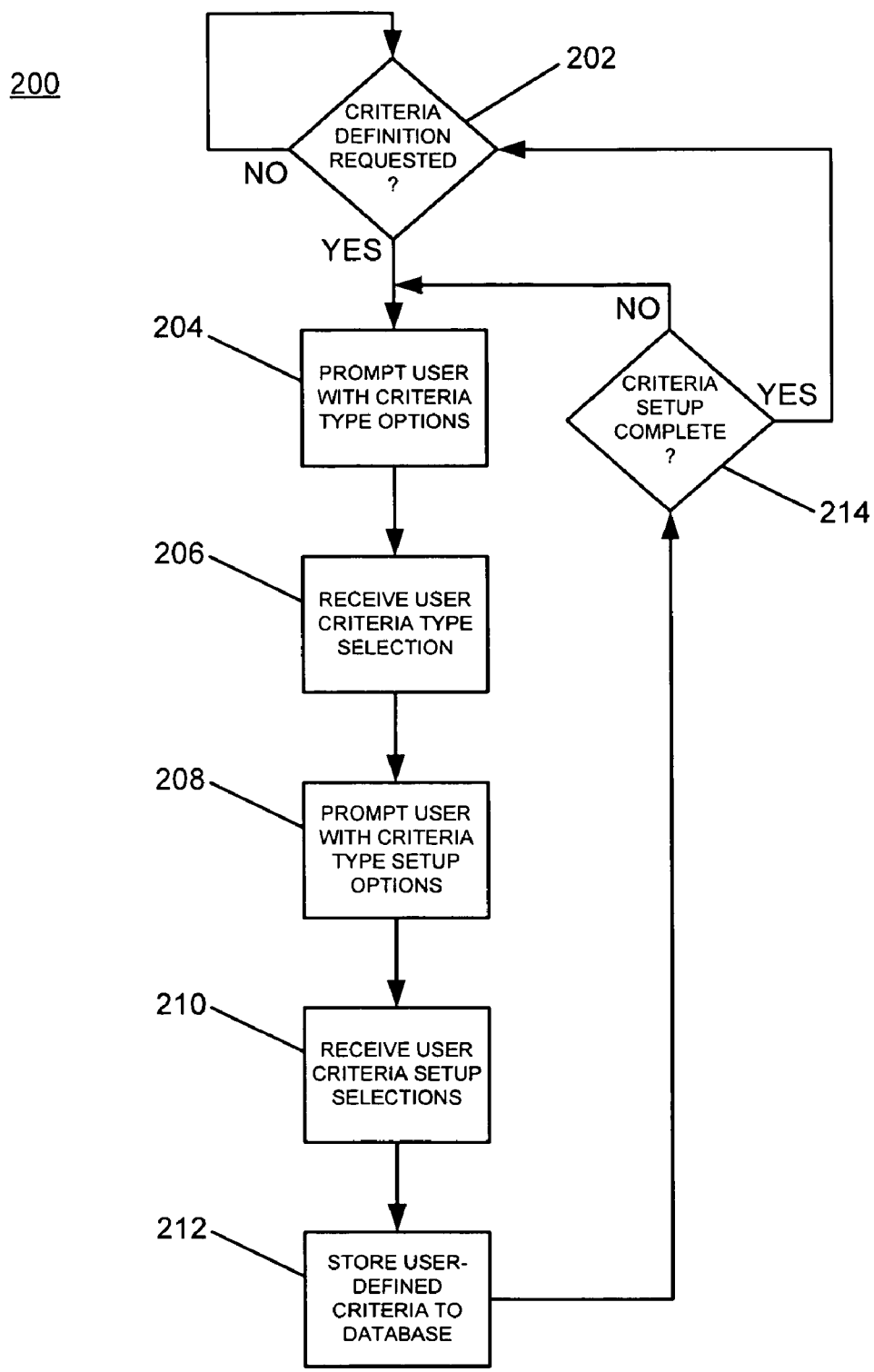
FIG. 2 is a flow chart illustrating exemplary steps by which a criteria definition process may allow a user to create criteria definitions according to an embodiment of the subject matter described herein.

FIG. 2 illustrates an exemplary criteria definition process 200 for allowing a user to create criteria definitions. At decision point 202, criteria definition process 200 may wait for a user to request to create a criteria definition. This request may be, for example, an application-level selection by a user or an affirmative response by a user to a prompt at an application level inquiring as to whether the user would like to create a criteria definition for an entry field.

When a criteria definition has been requested at decision point 202, criteria definition process 200 may prompt the user with criteria type options at block 204. These criteria type options may include, for example, any of the criteria rule type definitions discussed above. For example, a user may be presented with a selection list with which the user may choose to define a significant sequence rule, a pre-sensitive-data padding rule, a post-sensitive-data padding rule, an interval padding rule, a formulaic interval-padding rule, a feedback rule criteria, a combination rule, and a default override rule.

A block 206, criteria definition process 200 may receive a user criteria type selection. Depending upon the criteria type selected at block 206, criteria definition process 200 may prompt the user with criteria type set-up options at block 208. These criteria type set-up options may vary depending upon which criteria type option was selected by the user.

For example, for a significant sequence rule type definition, the user may choose between a definition which includes the significant sequence characters, or may choose to randomize the criteria by selecting a random entry mode in conjunction with a significant sequence, as discussed above. As well, for either a pre-sensitive data padding rule or a post-sensitive data padding rule, the user may be prompted for a number of padding characters to appear either before or after sensitive data, respectively. For an interval padding rule, a user may be prompted for an interval size and a padding character length, as discussed above. When a user has selected the formulaic interval padding rule, for example, a user may be prompted with a dynamic collection of type set-up options depending upon the formula requested or a combination thereof. Exemplary feedback rule type set-up options may include audible feedback, visual feedback, olfactory feedback and tactile feedback, and discussed above. When more than one rule has been previously defined and the user has selected a combination rule to define, the criteria type set-up options may include a selection list of available criteria definitions. When a user has selected a default override rule to define, the user may be prompted to enter a default character sequence for use in a default override condition, as discussed above.

When the user has completed criteria type set-up option selections, criteria definition process 200 may receive the user's selections at block 210. At block 212, criteria definition process 200 may store the user defined criteria to a database.

At decision point 214, criteria definition process 200 may determine whether the user has completed criteria definition entry. If the user wishes to create more criteria definitions, criteria definition process 200 may transition to block 204 and repeat the processes described above for a new criteria definition type. When criteria set-up is complete, a transition may be made back to decision point 202 to await new criteria definition requests.

Figure 3:
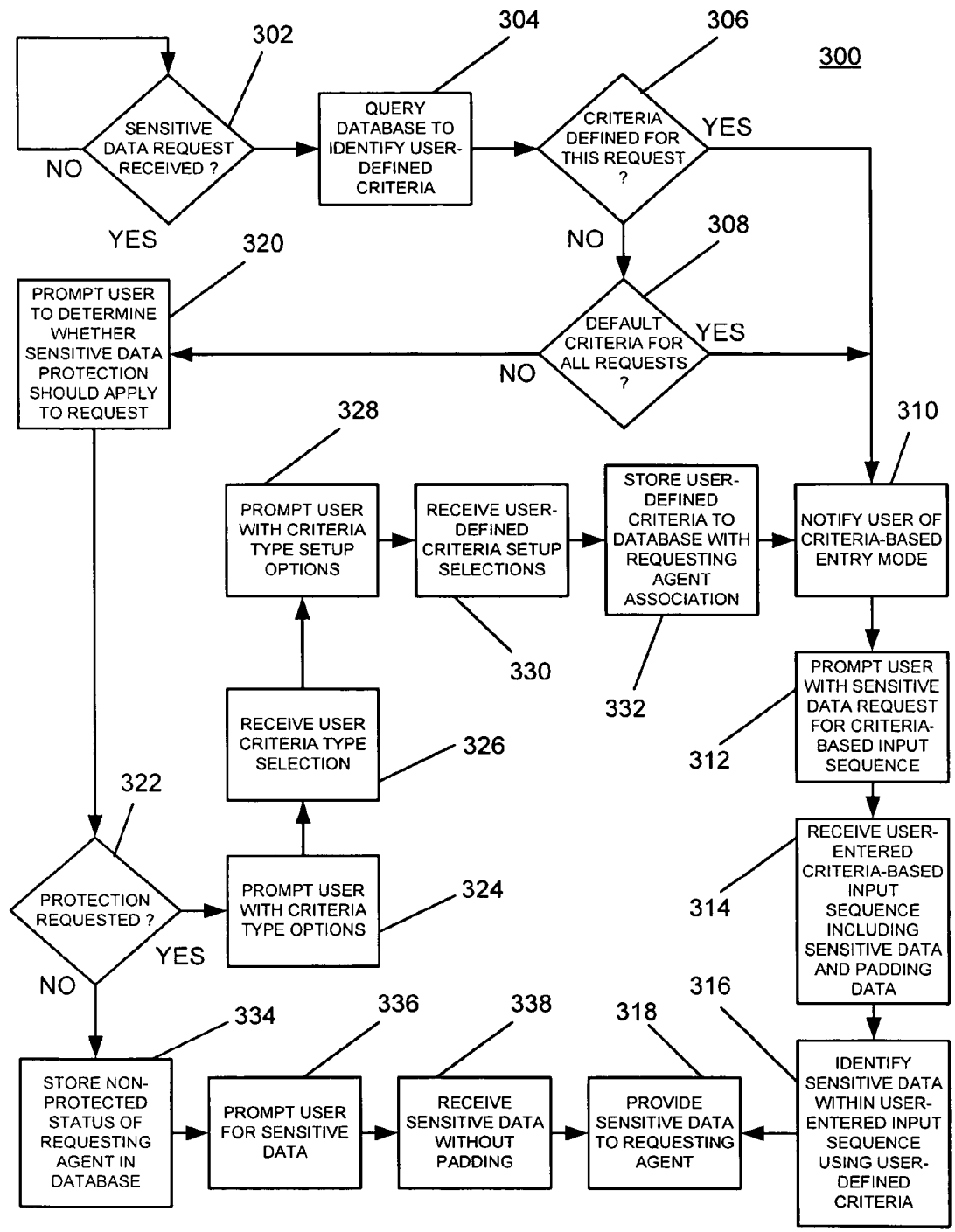
FIG. 3 is a flow chart illustrating exemplary steps by which a sensitive data process may use user-defined criteria to disguise sensitive data entry according to an embodiment of the subject matter described herein.

FIG. 3 illustrates an exemplary sensitive data entry process 300 wherein user-defined criteria may be used to disguise sensitive data entry. The process may wait at decision point 302 until a sensitive data request has been received from the requesting agent. As discussed above, a requesting agent may be any interface for entry of sensitive data. For example, a requesting agent may be a text entry prompt in an application, such as a login prompt for an application or website, and may be an application-level requesting agent such as an account information application that may provide access to sensitive data. Data-entry field types may be identified by sensitive data entry process 300 when presented to a user for data entry.

When a sensitive data request has been received, sensitive data entry process 300 may query a database to retrieve any user-defined criteria that may be associated with the requesting agent at block 304. At decision point 306, sensitive data entry process 300 may determine whether any criteria have been defined for this requesting agent and identify the user-defined criteria to be applied. When there have been no criteria previously defined for this requesting agent, sensitive data entry process 300 may determine whether any default criteria have been previously defined at decision point 308. Default criteria may be user-defined to apply to all requests, or all requests of a defined type such as, for example, all web login prompts and all personal identification number (PIN) prompts. When default criteria for all requests have been previously defined or when criteria have been previously defined for this requesting agent, as determined at decision point 308 and decision point 306, respectively, the user may be notified of criteria-based entry mode at block 310.

With the user notified of criteria-based entry mode at block 310, the user may be prompted with a sensitive data request for a criteria-based input sequence at block 312. As discussed above, a criteria-based input sequence may include both sensitive data and padding data arranged according to user-defined criteria-based entry selections. At block 314, sensitive data entry process 300 may receive a user-entered criteria-based input sequence which includes sensitive data and padding data.

At block 316, sensitive data entry process 300 may identify sensitive data within the user-entered input sequence using the user-defined criteria. When sensitive data has been identified at block 316, it may be provided to the requesting agent at block 318. Providing the sensitive data to the requesting agent may include, for example, passing the sensitive data sequence to the requesting agent as an encrypted or unencrypted character sequence. By allowing the user to enter sensitive data and padding data based upon user-defined criteria, a user may be able to disguise sensitive data from would-be identity thieves.

When no default criteria for all requests have been defined, as determined at decision point 308, the user may be prompted to determine whether the user would like to define sensitive data protection to apply to this request at block 320. At decision point 322, sensitive data entry process 300 may determine whether the user wishes to protect this data entry. When the user has requested protection for this data entry, the user may be prompted with criteria type options at block 324. At block 326, sensitive data entry process 300 may receive a user criteria type selection. At block 328, the user may be prompted with criteria type set-up options. Sensitive data entry process 300 may receive user-defined criteria set-up selections at block 330.

Because this criteria definition may be associated with a requesting agent due to its creation in response to a sensitive data request, a set-up selection may include another option. This option may include, for example, whether to apply these user-defined criteria definition to all data entry fields of this type, to all requests from this requesting agent, to all requests for this specific information, or to apply it only to this sensitive data entry transaction.

At block 332, any user-defined criteria may be stored to the database and associated, for example, with the field type, the requesting agent, the data entry field of this requesting agent, or all requests for this specific information. The requesting agent may further be associated with a uniform resource locator (URL), or any other identifier that may be identified when a sensitive data request is received. After database storage of any user-defined criteria, sensitive data entry process 300 may transition to block 310 and progress as discussed above.

When protection for this data entry has not been requested, as determined by decision point 322, a non-protected status may be associated with this data-entry field, data-entry field type, requesting agent, or requesting-agent type, and this information may be stored in the database at block 334. In this way, a user may avoid future prompts for criteria definition based upon the same or a similar request from the same or a similar requesting agent depending upon user-defined criteria. At block 336, the user may be prompted for sensitive data associated with the requesting agent. The sensitive data may be received without padding at block 338, and provided to the requesting agent, as discussed above, at block 318.

Figure 4:
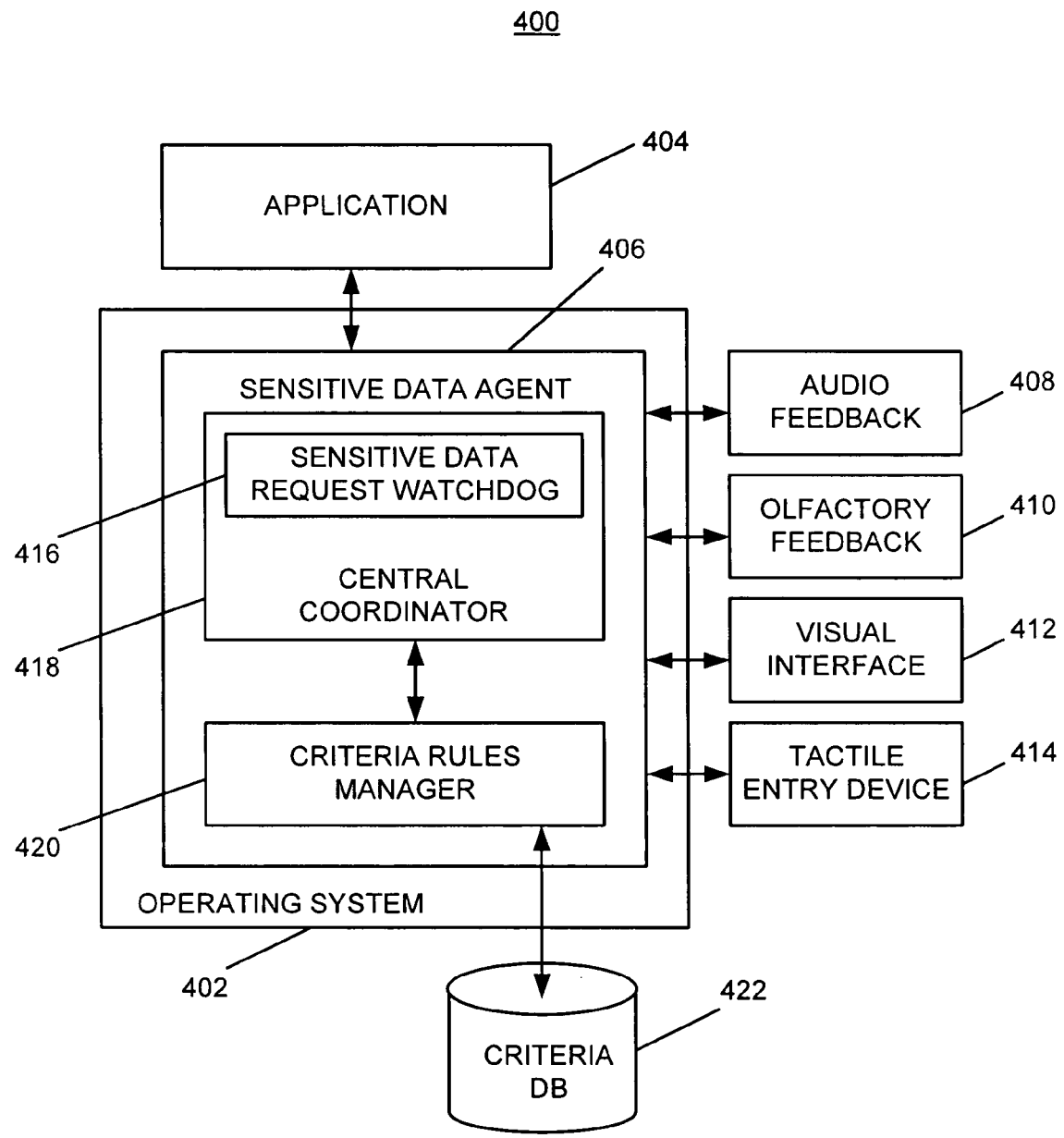
FIG. 4 is a block diagram of an exemplary sensitive data system with a sensitive data module integrated as an operating system plug-in for sensitive data protection using user-defined criteria according to an embodiment of the subject matter described herein.

FIG. 4 illustrates an exemplary sensitive data system 400 with a sensitive data module integrated as an operating system plug-in for sensitive data protection using user-defined criteria. Sensitive data system 400 includes an operating system 402. Operating system 402 may reside on a single device or may reside as part of a distributed operating system across multiple interconnected devices or across a network. Application 404 represents a module that may request sensitive data from a user. Like the distributed nature of operating system 402, a requesting agent, such as application 404, may be distributed or may be a client/server-based application with a portion of the application executing on a remote device over a network, and may be a web page to prompt a user for information. As discussed above, a requesting agent may also include a data field in an application, such as a web page or login screen of an application. In this way, multiple requesting agents may be associated with an application such as application 404.

Sensitive data agent 406 may interface with application 404 for receiving a user-entered input sequence including sensitive data and padding data, for using stored user-defined criteria to identify sensitive data within the user-entered input sequence, and for providing the sensitive data to a requesting agent. In this exemplary embodiment, sensitive data agent 406 is shown with four user interface modules: audio feedback module 408, olfactory feedback module 410, visual interface module 412, and tactile entry device 414.

Audio feedback module 408 may be used to provide feedback to a user in the form of audio signals. As discussed above, these audio signals may include audio sound recording files, beeps, or any other audible signal that may be perceived by a user.

Olfactory feedback module 410 may be used to provide feedback to a user in the form of an olfactory sensation. As discussed above, this olfactory stimulus may include a spray of perfume, the scent of popcorn, or any other scent that may be perceived by a user.

Visual interface module 412 may be used to provide feedback to a user in the form of a visual cue. As discussed above, this visual cue may include an icon, a text message display, or any other visual cue that may be perceived by a user.

Tactile entry device 414 may be used both to provide feedback to a user in the form of a tactile cue to identify to a user when sensitive and padding data entry should occur, as well as for entry of the sensitive data and padding data. As discussed above, tactile entry device may be a keyboard or keypad, as well as any other entry device capable of a tactile cue that may be perceived by a user.

Sensitive data request watchdog 416 and central coordinator 418 are shown within sensitive data agent 406. Sensitive data request watchdog 416 may monitor activities within application 404 to identify when a user is to be prompted for information entry from a requesting agent, such as application 404 or a data entry field within application 404. For example, sensitive data request watchdog 416 may determine when a user is to be prompted for information entry from a requesting agent based on detecting a specific application requesting or receiving data, based on detecting a specific field in the application, based on detecting a specific uniform resource identifier (URL) in an application (such as an Internet address in a browser), or based on other like information. Sensitive data request watchdog 416 may inform central coordinator 418 of the pending information request.

In one implementation, sensitive data request watchdog 416 may include a sensitive text input widget. Text input widgets are well-known to graphical user interface (GUI) programmers and designers. The sensitive text input widget may be extensions of the text input widget supplied by a GUI library in an associated operating system. The sensitive text input widget can use the rules from criteria rules manager 420 to detect a sensitive data request. The sensitive text input widget may also use the rules from criteria rules manager 420 to remove the padding data so that it is not passed on to the requesting agent.

In response to a request for information, central coordinator 418 may interact with criteria rules manager 420 to determine whether any user-defined criteria are related to this requesting agent or whether a user-defined default rule are stored in criteria database 422. As discussed in relation to other embodiments, sensitive data agent 406 may use visual interface 412 and tactile entry device 414 to interact with the user to either capture a user input sequence or to allow the user to define new user-defined criteria.

When either default user-defined criteria or user-defined criteria related to the requesting agent are present, the user may be prompted by criteria rules manager 420 according to the user-defined criteria for an input sequence including both sensitive and padding data. This prompting may include feedback to identify when sensitive and padding portions of a user-input sequence are to be entered, in which case, any of audio feedback module 408, olfactory feedback module 410, visual interface module 412, and tactile entry device 414 may be used to provide this feedback.

When there is not a user-defined default criterion or a user-defined criterion associated with the requesting agent, sensitive data agent 406 may interface with the user to allow the user to define criteria using any of the interface, entry and feedback modules. When a user-defined criterion has been created, it may be stored in criteria database 422 by criteria rules manager 420.

Figure 5:
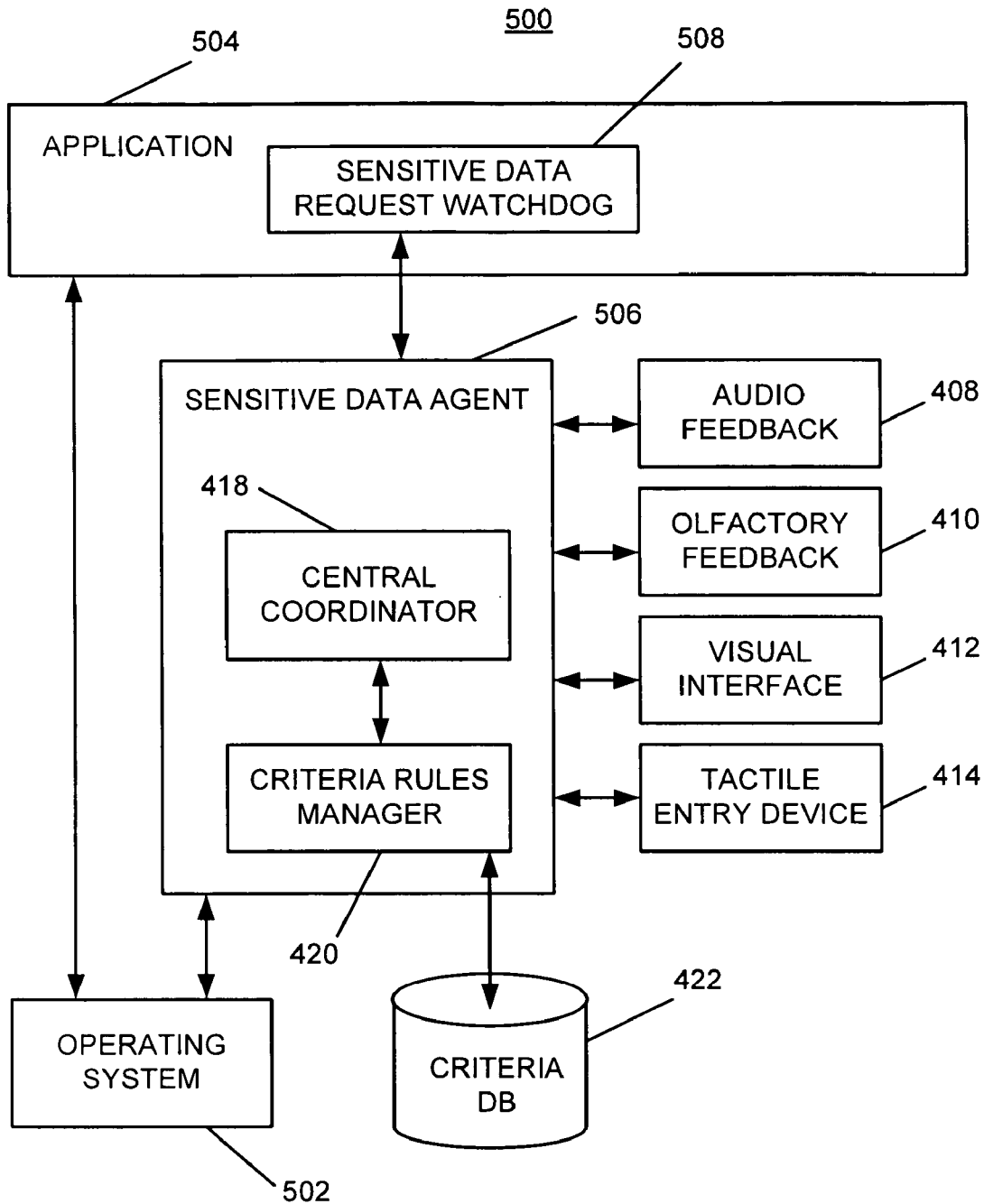
FIG. 5 is a block diagram of an exemplary sensitive data system with a sensitive data module integrated as an application plug-in for sensitive data protection using user-defined criteria according to an embodiment of the subject matter described herein.

FIG. 5 illustrates an exemplary sensitive data system 500 with a sensitive data module integrated as an application plug-in for sensitive data protection using user-defined criteria. Sensitive data system 500 includes an operating system 502. Operating system 502 may reside on a single device or may reside as part of a distributed operating system across multiple interconnected devices or across a network. Application 504 may request sensitive data from a user. Like the distributed nature of operating system 502, a requesting agent, such as application 504, may be distributed or may be a client/server-based application with a portion of the application executing on a remote device over a network, and may be a web page to prompt a user for information. As discussed above, a requesting agent may also include a data field in an application, such as a web page or login screen of an application. In this way, multiple requesting agents may be associated with an application such as application 504.

Sensitive data agent 506 may interface with application 504 for receiving a user-entered input sequence including sensitive data and padding data, for using stored user-defined criteria to identify sensitive data within the user-entered input sequence, and for providing the sensitive data to a requesting agent.

In this exemplary embodiment, sensitive data agent 506 is shown with sensitive data request watchdog 508 external to sensitive data agent 506 and as a plug-in for application 504. In this exemplary embodiment, a sensitive data system, such as sensitive data system 500 may be deployed without redesigning lower-level resources, such as operating system 502. Sensitive data request watchdog 508 may be used with application 504 to allow sensitive data system 500 to perform any of the activities discussed above in relation to FIG. 4.

For example, sensitive data request watchdog 508 may monitor activities within application 504 to identify when a user is to be prompted for information entry from a requesting agent, such as application 504 or a data entry field within application 504. Sensitive data request watchdog 508 may inform central coordinator 418 of the pending information request. In response to a request for information, central coordinator 418 may interact with criteria rules manager 420 to determine whether any user-defined criteria related to this requesting agent or whether a user-defined default rule are stored in criteria database 422. As discussed in relation to other embodiments, sensitive data agent 506 may use visual interface 412 and tactile entry device 414 to interact with the user to either capture a user input sequence or to allow the user to define new user-defined criteria.

When either default user-defined criteria or user-defined criteria related to the requesting agent are present, the user may be prompted by criteria rules manager 420 according to the user-defined criteria for an input sequence including both sensitive and padding data. This prompting may include feedback to identify when sensitive and padding portions of a user-input sequence are to be entered, in which case, any of audio feedback module 408, olfactory feedback module 410, visual interface module 412, and tactile entry device 414 may be used to provide this feedback.

When there is not a user-defined default criterion or a user-defined criterion associated with the requesting agent, sensitive data agent 506 may interface with the user to allow the user to define criteria using any of the interface, entry and feedback modules. When a user-defined criterion has been created, it may be stored in criteria database 422 by criteria rules manager 420.

A system for identifying sensitive data from a user-entered input sequence based on user-defined criteria may include means for receiving user-defined criteria for identifying sensitive data within user-entered input sequences that include sensitive data and padding data. For example, in FIG. 4, tactile entry device 412 may allow a user to enter user-defined criteria which may be received by sensitive data agent 406 for use in identifying sensitive data within user-entered input sequences that include sensitive data and padding data. User-defined criteria may also be stored to criteria database 422. In FIG. 4, sensitive data agent 406 may also, for example, receive user-defined criteria via criteria rules manager 420 from criteria database 422 for use in identifying sensitive data within user-entered input sequences that 5 include sensitive data and padding data. Likewise, in FIG. 5, sensitive data agent 506 may receive user-defined criteria for identifying sensitive data within user-entered input sequences that include sensitive data and padding data from either tactile entry device 412 or via criteria rules manager 420 from criteria database 422.

The system may further include means for presenting a request for sensitive data from a requesting agent. For example, in both FIG. 4 and FIG. 5, visual interface 412 may present a request for sensitive data from a requesting agent to a user.

The system may also include means for receiving a user-entered input sequence that includes sensitive data and padding data in response to the request for sensitive data. For example, in both FIG. 4 and FIG. 5, tactile entry device 414 may allow a user to enter input sequences including sensitive data and padding data in response to the request for sensitive data that may be received by sensitive data agents 406 and 506, respectively.

The system may also include means for identifying the sensitive data within the user-entered input sequence using the user-defined criteria. For example, in FIGS. 4 and 5, sensitive data within user-entered input sequences may be identified using the user-defined criteria by sensitive data agents 406 and 506, respectively.

The system may also include means for providing the identified sensitive data to the requesting agent in response to the request for sensitive data. For example, in FIG. 4, the identified sensitive data may be provided to application 404 by sensitive data agent 406 in response to the request for sensitive data. Likewise, in FIG. 5 for example, the identified sensitive data may be provided to application 504 by sensitive data agent 506 in response to the request for sensitive data.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying sensitive data from a user-entered input sequence based on user-defined criteria, the method comprising:

receiving user-defined criteria for identifying sensitive data within user-entered input sequences that include sensitive data and padding data, the user-defined criteria including a formulaic interval padding rule identifying a location of padding data character using a formula based upon at least one of addition, subtraction, multiplication, and division of at least one of a first padding data location and a first number of padding characters;

presenting a request for sensitive data from a requesting agent;

determining whether the request is associated with any of the user-defined criteria or default criteria for sensitive data entry, and, in response to determining that the request is associated with any of the user defined criteria or default criteria for sensitive data entry, notifying the user of a criteria-based data entry mode;

receiving an input sequence that includes sensitive data and padding data entered by the user according to the criteria-based data entry mode;

identifying the sensitive data within the input sequence using the criteria-based data entry mode; and providing the identified sensitive data to the requesting agent in response to the request for sensitive data, wherein at least one of the preceding actions is performed on at least one electronic hardware component.

2. A method for identifying sensitive data from a user-entered input sequence based on user-defined criteria, the method comprising:

receiving user-defined criteria for identifying sensitive data within user-entered input sequences that include sensitive data and padding data, the user-defined criteria including a default override rule specifying a sequence of at least one character to be entered by the user when the user-defined criteria have been forgotten and for triggering an indication of when the user should enter at least one of the sensitive data and the padding data;

presenting a request for sensitive data from a requesting agent;

determining whether the request is associated with any of the user-defined criteria or default criteria for sensitive data entry, and, in response to determining that the request is associated with any of the user defined criteria or default criteria for sensitive data entry, notifying the user of a criteria-based data entry mode;

receiving an input sequence that includes sensitive data and padding data entered by the user according to the criteria-based data entry mode;

identifying the sensitive data within the input sequence using the criteria-based data entry mode; and providing the identified sensitive data to the requesting agent in response to the request for sensitive data, wherein at least one of the preceding actions is performed on at least one electronic hardware component.

3. The method of claim 2 wherein the user-defined criteria include a significant sequence rule defining the padding data to include a sequence of at least one character to appear before the sensitive data.

4. The method of claim 2 wherein the significant sequence rule defines a random number of characters to appear before the at least one character.

5. The method of claim 2 wherein the user-defined criteria include a pre-sensitive-data padding rule defining the padding data to include a number of padding characters to appear before the sensitive data.

6. The method of claim 2 wherein the user-defined criteria include a post-sensitive-data padding rule defining the padding data to include a number of padding characters to appear after the sensitive data.

7. The method of claim 2 wherein the user-defined criteria include an interval padding rule defining the padding data to include a number of padding characters to appear between a number of characters of the sensitive data.

8. The method of claim 2 wherein the user-defined criteria include a feedback rule identifying a user-defined feedback type for notifying the user of the criteria-based data entry mode.

9. The method of claim 8 wherein the feedback type includes at least one of audible feedback, visual feedback, olfactory feedback, and tactile feedback.

10. The method of claim 2 wherein the user-defined criteria include a combination rule combining at least two of a significant sequence rule, a pre-sensitive-data padding rule, a post-sensitive-data padding rule, a feedback rule, an interval padding rule, and a formulaic interval padding rule.

11. The method of claim 2 wherein the user-defined criteria include a criteria sequence rule specifying, on successive user interactions, a sequence of at least two of a significant sequence rule, a pre-sensitive-data padding rule, a post-sensitive-data padding rule, a feedback rule, an interval padding rule, and a formulaic interval padding rule.

12. The method of claim 2 wherein the indication includes at least one of an audible indication, a visual indication, an olfactory indication, and a tactile indication.

13. The method of claim 2 wherein presenting a request for sensitive data from a requesting agent includes presenting the request from an application local to the user.

14. The method of claim 2 wherein presenting a request for sensitive data from a requesting agent includes presenting the request from an application remote from the user.

15. A system for identifying sensitive data from a user-entered input sequence based on user-defined criteria, the system comprising components including:

a user-defined criteria database component for storing user-defined criteria to be used to identify sensitive data within user-entered input sequences that include sensitive data and padding data, the user-defined criteria including a default override rule specifying a sequence of at least one character to be entered by the user when the user-defined criteria have been forgotten and for triggering an indication of when the user should enter at least one of the sensitive data and the padding data; and a sensitive data agent component configured for:

determining whether the request is associated with any of the user defined criteria or default criteria for sensitive data entry, and, in response to determining that the request is associated with any of the user-defined criteria or the default criteria for sensitive data entry, notifying the user of a criteria-based data entry mode;

receiving an input sequence including sensitive data and padding data entered by the user according to the criteria-based data entry mode;

using the stored criteria-based data entry mode to identify sensitive data within the input sequence; and providing the sensitive data to a requesting agent, wherein at least one of the system components includes at least one electronic hardware component.

16. The system of claim 15 wherein the user-defined criteria include a significant sequence rule defining the padding data to include a sequence of at least one character to appear before the sensitive data.

17. The system of claim 16 wherein the significant sequence rule defines a random number of characters to appear before the at least one character.

18. The system of claim 15 wherein the user-defined criteria include a pre-sensitive-data padding rule defining the padding data to include a number of padding characters to appear before the sensitive data.

19. The system of claim 15 wherein the user-defined criteria include a post-sensitive-data padding rule defining the padding data to include a number of padding characters to appear after the sensitive data.

20. The system of claim 15 wherein the user-defined criteria include an interval padding rule defining the padding data to include a number of padding characters to appear between a number of characters of the sensitive data.

21. The system of claim 15 wherein the user-defined criteria include a formulaic interval padding rule identifying a location of a padding data character using a formula.

22. The system of claim 15 wherein the user-defined criteria include a combination rule combining at least two of a significant sequence rule, a pre-sensitive-data padding rule, a post-sensitive-data padding rule, a feedback rule, an interval padding rule, and a formulaic interval padding rule.

23. The method of claim 15 wherein the user-defined criteria include a criteria sequence rule specifying, on successive user interactions, a sequence of at least two of a significant sequence rule, a pre-sensitive-data padding rule, a post-sensitive-data padding rule, a feedback rule, an interval padding rule, and a formulaic interval padding rule.

24. The system of claim 15 wherein the indication includes at least one of an audible indication, a visual indication, an olfactory indication, and a tactile indication.

25. The system of claim 15 wherein the requesting agent includes an application local to the user.

26. The system of claim 15 wherein the requesting agent includes an application remote from the user.

27. A system for identifying sensitive data from a user-entered input sequence based on user-defined criteria, the system comprising components including:

a user-defined criteria database component for storing user-defined criteria to be used to identify sensitive data within user-entered input sequences that include sensitive data and padding data, the user-defined criteria including a formulaic interval padding rule identifying a location of a padding data character using a formula based upon at least one of addition, subtraction, multiplication, and division of at least one of a first padding data location and a first number of padding characters, and a sensitive data agent component configured for:

determining whether the request is associated with any of the user defined criteria or default criteria for sensitive data entry, and, in response to determining that the request is associated with any of the user-defined criteria or the default criteria for sensitive data entry, notifying the user of a criteria-based data entry mode;

receiving an input sequence including sensitive data and padding data entered by the user according to the criteria-based data entry mode;

using the stored criteria-based data entry mode to identify sensitive data within the input sequence; and providing the sensitive data to a requesting agent, wherein at least one of the system components includes at least one electronic hardware component.

28. The system of claim 15 wherein the user-defined criteria include a feedback rule identifying a user-defined feedback type for notifying the user of the criteria-based data entry mode.

29. The system of claim 28 wherein the feedback type includes at least one of audible feedback, visual feedback, olfactory feedback, and tactile feedback.

30. A system for identifying sensitive data from a user-entered input sequence based on user-defined criteria, the system comprising:

means for receiving user-defined criteria for identifying sensitive data within user-entered input sequences that include sensitive data and padding data, the user-defined criteria including a default override rule specifying a sequence of at least one character to be entered by the user when the user-defined criteria have been forgotten and for triggering an indication of when the user should enter at least one of the sensitive data and the padding data;

means for presenting a request for sensitive data from a requesting agent;

means for determining whether the request is associated with any of the user defined criteria or default criteria for sensitive data, and, in response to determining that the request is associated with any of the user-defined criteria or the default criteria for sensitive data entry, for notifying the user of a criteria-based data entry mode;

means for receiving an input sequence that includes sensitive data and padding data entered by the user according to the criteria-based data entry mode;

means for identifying the sensitive data within the input sequence using the criteria-based data entry mode; and means for providing the identified sensitive data to the requesting agent in response to the request for sensitive data, wherein at least one of the means includes at least one electronic hardware component.

31. A computer program product comprising computer-executable instructions embodied in a non-transitory computer-readable medium for performing steps comprising:

receiving user-defined criteria for identifying sensitive data within user-entered input sequences that include sensitive data and padding data, the user-defined criteria including a default override rule specifying a sequence of at least one character to be entered by the user when the user-defined criteria have been forgotten and for triggering an indication of when the user should enter at least one of the sensitive data and the padding data;

presenting a request for sensitive data from a requesting agent;

determining whether the request is associated with any of the user defined criteria or default criteria for sensitive data, and, in response to determining that the request is associated with any of the user-defined criteria or the default criteria for sensitive data entry, for notifying the user of a criteria-based data entry mode;

receiving an input sequence that includes sensitive data and padding data entered by the user according to the criteria-based data entry mode;

identifying the sensitive data within the input sequence using the criteria-based data entry mode; and providing the identified sensitive data to the requesting agent in response to the request for sensitive data.

* * * * *